(12) United States Patent
Hamprecht et al.

(10) Patent No.: US 7,854,951 B2
(45) Date of Patent: Dec. 21, 2010

(54) METHOD AND DEVICE FOR TREATING MILK, IN PARTICULAR BREAST MILK

(75) Inventors: Klaus Hamprecht, Tuebingen (DE); Klaus Lauf, Tuebingen (DE)

(73) Assignee: Eberhard-Karls-Universitaet Tuebingen Universitaetsklinikum, Tuebingen (DE)

( * ) Notice: Subject to any disclaimer, the term of this patent is extended or adjusted under 35 U.S.C. 154(b) by 244 days.

(21) Appl. No.: 11/522,309

(22) Filed: Sep. 15, 2006

(65) Prior Publication Data

US 2007/0071867 A1    Mar. 29, 2007

Related U.S. Application Data

(63) Continuation of application No. PCT/EP2005/002398, filed on Mar. 8, 2005.

(30) Foreign Application Priority Data

Mar. 16, 2004    (DE) .................. 10 2004 013 834

(51) Int. Cl.
*A23C 3/03*    (2006.01)
(52) U.S. Cl. .................. 426/580; 426/522; 426/524
(58) Field of Classification Search .................. 426/580, 426/520–522, 524
See application file for complete search history.

(56) References Cited

U.S. PATENT DOCUMENTS

| | | | | |
|---|---|---|---|---|
| 1,369,345 A | * | 2/1921 | Lobeck .................. | 426/522 |
| 1,447,251 A | * | 3/1923 | Kitchen .................. | 426/409 |
| 2,388,103 A | * | 10/1945 | Whitaker et al. .................. | 426/405 |
| 3,934,042 A | * | 1/1976 | De Stoutz .................. | 426/248 |
| 4,376,096 A | * | 3/1983 | Bowen .................. | 422/116 |
| 5,154,940 A | * | 10/1992 | Budzyna et al. .................. | 426/232 |
| 5,288,471 A | * | 2/1994 | Corner .................. | 422/307 |
| 5,797,313 A | * | 8/1998 | Rothley .................. | 99/483 |
| 6,120,824 A | * | 9/2000 | Mendez .................. | 426/397 |
| 6,276,264 B1 | * | 8/2001 | Dumm .................. | 99/455 |
| 6,617,552 B1 | * | 9/2003 | Taylor .................. | 219/400 |
| 2002/0031462 A1 | * | 3/2002 | Jorgensen .................. | 422/307 |
| 2005/0112257 A1 | * | 5/2005 | Feldmeier .................. | 426/521 |
| 2006/0159817 A1 | | 7/2006 | Jahn et al. | |

FOREIGN PATENT DOCUMENTS

DE    199 25 497 A1    12/2000

(Continued)

OTHER PUBLICATIONS

Dhar, J. et al. (1996) "Pasteurization efficiency of a HTST system for human milk" Journal of Food Science 61:569-572, 595.

*Primary Examiner*—Drew E Becker
(74) *Attorney, Agent, or Firm*—Knobbe Martens Olson & Bear LLP

(57) ABSTRACT

The present invention relates to a method for treating milk, preferably breast milk, in which the milk is briefly heated in a container, said method comprising the following steps: The container is moved, preferably set in rotation, so that a milk film forms on its inner wall, the milk is heated to a treatment temperature during a heating phase, the milk is maintained at the treatment temperature for a treatment period of less than 20 seconds, and the milk is cooled to room temperature.

14 Claims, 5 Drawing Sheets

FOREIGN PATENT DOCUMENTS

| | | |
|---|---|---|
| DE | 199 29 130 A1 | 12/2000 |
| GB | 332950 | 7/1930 |
| GB | 363048 | 12/1931 |
| GB | 634434 | 3/1950 |
| GB | 1 591 821 | 6/1981 |
| WO | WO 00/74494 A2 | 12/2000 |

* cited by examiner

METHOD AND DEVICE FOR TREATING MILK, IN PARTICULAR BREAST MILK

CROSS-REFERENCES TO RELATED APPLICATIONS

This application is a continuation of copending International Patent Application PCT/EP2005/002398 filed on Mar. 8, 2005 and designating the United States, which was not published under PCT Article 21(2) in English, and claims priority of German Patent Application DE 10 2004 013 834.6 filed on Mar. 16, 2004, which is incorporated herein by reference.

BACKGROUND OF THE INVENTION

1. Field of the Invention

A subject of the present invention is a method for treating milk, preferably breast milk, in which the milk is briefly heated in a container, said method comprising the following steps:
the container is moved, preferably set in rotation, so that a milk film forms on its inner wall,
the milk is heated to a treatment temperature during a heating phase,
the milk is maintained at the treatment temperature for a treatment period of less than 20 seconds, and
the milk is cooled to room temperature.

Another subject of the present invention is a device for treating milk, preferably breast milk, in which the milk is briefly heated in a container, with an arrangement by which the container is held and moved, preferably rotated, with a heat source for heating the milk to a treatment temperature, and with a cold source for cooling the milk to room temperature.

2. Related Prior Art

A method and a device of the kind mentioned above are known from WO 00/74494 A2.

The known method and the known device are used to preserve milk, in particular breast milk, intended for storage or later use and/or to remove infectious microorganisms from the milk. Methods of this kind are generally known under the name pasteurization.

Feeding with breast milk not only offers infants, in particular preterm infants, advantages in terms of the feeding itself, but also has immunological advantages, since breast milk contains, in addition to protein, fat and carbohydrates, also many other constituents which ensure that breastfed children are less susceptible to infections and allergens than are children who have not been breastfed.

To avoid uncontrolled transmission of infectious diseases, the system of milk banks, in which breast milk from various donors was pooled, processed and then stored for later use, has now been abandoned. Therefore, in order to avoid infections, there is now once again a clear coordination between the infant and its own mother's breast milk.

However, for feeding preterm infants, this means that their own mother's breast milk has to be pumped off, processed and stored temporarily in the hospital and/or at home since, because of the immaturity and the low food intake capacity, and the frequent feeding associated therewith, these preterm infants cannot be breastfed. An additional factor is that preterm infants frequently remain three to four months in the hospital whereas the mothers are discharged only a short time after delivery, so that appropriate stocks of breast milk must be present in the hospital in order to ensure continuous feeding of the preterm infants. The technical significance of this is that even small volumes, for example of 20 ml, have to be processed and stored individually.

However, the known method and the known device are not just applicable for feeding infants, in particular preterm infants; they also have an application in the veterinary sector, for example in zoological gardens and for rare mammals.

The known device comprises two water baths into which a rotating round-bottom flask containing the milk to be treated is immersed in succession. At least in the immersed state, the round-bottom flask is set in rotation so that the milk forms a thin film on the inside wall of the round-bottom flask. The speed of rotation is about 300 rpm.

The rotating round-bottom flask is immersed for about 20 to 25 seconds into the first water bath which has been heated to 85 to 90° C., the temperature of the milk film rising to 68 to 70° C.

The still rotating round-bottom flask is then lifted from the first water bath and exposed for 5 seconds to the ambient air, the milk film reaching a target temperature of about 72° C. through delayed heating and heat exchange with the environment.

Thereafter, the still rotating round-bottom flask is immersed for about 20 seconds into a second water bath which is at a temperature of 2 to 4° C. After the round-bottom flask is lifted out of the second water bath, the breast milk again has a temperature of about 30° C. The entire inactivation cycle is completed after about one minute.

With the known device and the known method, it is possible to completely inactivate infectious microorganisms in the breast milk thus treated, but without denaturation of constituents of the milk taking place, and with most of the immunological properties of the milk being retained.

In this connection, the aforementioned WO 00/74494 A2 describes how in particular the cytomegalovirus (hereinafter CMV), which nowadays leads to the most common prenatal infections, can be completely inactivated by the known method and with the known device. However, other infectious microorganisms that may be present in breast milk can also be completely inactivated in this way.

The known method and the known device therefore have considerable advantages over two other treatment methods in which the inactivation is obtained either by heating for thirty minutes to 62.5° C. (Holder pasteurization) or by storing for many hours or even for several days at −20° C. (cryoinactivation). While cryoinactivation does not lead to complete inactivation of the infectious microorganisms, the activities of alkaline phosphatase and of lipase are much lower in Holder pasteurization than in the method described in WO 00/74494 A2.

However, lipase activity is particularly important for preterm infants, since it has been ascribed a key role in the absorption of fat in the preterm infant's intestine and has also been ascribed an important antiviral protective effect.

In the known method and in the known device, however, it is still considered to be a shortcoming that, compared to an untreated control, the lipase activity decreases by a factor of about two.

SUMMARY OF THE INVENTION

Against this background, the present invention has the object of taking a method and a device of the type mentioned at the outset and developing them in such a way that the biochemical parameters of suitably treated milk are still better maintained.

In the method mentioned at the outset, this object is achieved, according to the invention, by the fact that the treatment temperature is below about 65° C., preferably below about 63° C.

In the device mentioned at the outset, this object is achieved by the fact that a common temperature-control chamber is provided in which the rotating container can be exposed to the heating effect of the heat source and also to the cooling effect of the cold source.

The object of the invention is completely achieved in this way.

The inventors of the present application have in fact found that it is possible to lower the treatment temperature to below about 65° C. without compromising the inactivation effect on the infectious microorganisms that may be present in the milk. The reduction of the treatment temperature compared to the known method, while at the same time maintaining the short treatment period, leads in terms of the biochemical parameters, in particular the activity of alkaline phosphatase (hereinafter AP) and of lipase, to a considerably smaller decrease than in the three treatment methods described in the aforementioned WO 00/74494 A2.

Thus, in a wide variety of tests, the inventors have been able to achieve an almost 100% inactivation of infectious microorganisms even at a treatment temperature of 62° C., or just 60° C., and with a treatment period of 5 seconds, the biochemical parameters of the milk surprisingly being very well maintained.

This result was unexpected in view of the fact that, in the prior art, it was assumed that complete inactivation of the infectious microorganisms, in particular of CMV, was quite impossible at treatment periods of less than 20 seconds and at a treatment temperature of below about 65° C.

In the prior art it was assumed that, in methods of heat inactivation, a sufficient inactivation could only be achieved using temperatures of 72° C. and short treatment times, or, conversely, using temperatures of 62.5° C., but with a very long treatment time of 30 minutes.

The method according to the invention now has the safety of the known methods of heat inactivation, but at the same time affords the advantage that the biochemical parameters of the milk are better maintained. Thus, for example, it was possible to show that with treatment periods of one or two seconds and treatment temperatures of 62 or 63° C., significantly more than 50% of the AP activity and more than 10% of the lipase activity was maintained.

This method can be carried out particularly efficiently using the novel device, because the common temperature-control chamber means that the container does not have to be moved from one water bath to the other water bath, for which reason much shorter treatment periods are possible in this case than with the known device, where transferring the container from one water bath to the other requires at least 5 seconds, but generally 10 or 20 seconds.

Since both the heating and the cooling now take place in one and the same temperature-control chamber, the periods of heating and the duration of treatment itself can be set in a more reproducible and precise manner than in the known device, and the treatment temperature can also be maintained more exactly.

In the method according to the invention it is preferred if the heating phase lasts longer than 30 seconds, preferably longer than 60 seconds, but is still less than 180 seconds.

The heating phase, that is to say the period until the milk in the container is heated from room temperature to treatment temperature, is greater here than in the known methods. Without wishing to be bound to this explanation, the inventors of the present application presently assume that this "heating ramp" contributes substantially to the success of the novel method.

It is preferred if the treatment period is less than 5 seconds, preferably less than or equal to 3 seconds.

This measure has the advantage that, at lower temperatures than in the prior art, it is still possible to use treatment periods that are shorter than those described in the prior art. This permits a very gentle treatment of the milk, while the infectious microorganisms are still completely inactivated, and the biochemical parameters are compromised to a lesser extent than in the prior art.

It is further preferred if the container is immersed in the temperature-control chamber during the entire inactivation method.

As has already been mentioned, it is of advantage here that very short treatment periods are possible.

It is generally preferred if, during the heating phase, the milk is heated to the treatment temperature by a hot air stream that acts on the outside of the container.

The use of a hot air stream for heating purposes is already proposed in WO 00/74494 A2, but the container there is intended to be exposed to the hot air stream for about 20 to 25 seconds. To ensure that the milk in the container can be heated to the prescribed 72° C. during this short period, the air stream has to be at a very high temperature, which has proven disadvantageous in terms of maintaining the biochemical parameters.

With the novel method and the novel device, it is now possible to use a hot air source as the heat source, with the milk being heated for 30 seconds, preferably 60 seconds or longer. Since a longer period of time is now available for the heating and, furthermore, the treatment temperature is below 65° C., the temperature of the hot air stream can now be lower than in the known method and in the known device.

From control engineering, it is generally known that the rate of heating depends on the temperature difference between the heat source and the object that is to be heated. If the heating period is lengthened, this temperature difference can be reduced. A reduced temperature of the hot air stream, however, means less strain on the milk that is being treated.

In accordance with generally known methods in control engineering, the temperature and the velocity of the hot air stream can now be set as a finction of the desired heating period and of the treatment temperature. On the one hand, it is possible simply to control these parameters of the hot air stream, in other words to optimize them and then adjust them accordingly in each case. On the other hand, it is also possible to regulate these parameters, in other words to measure the temperature of the milk in each case and to adapt the temperature and the velocity of flow as a function of this actual value.

It is further preferred if, after the heating phase, the container remains in the temperature-control chamber and is preferably maintained at the treatment temperature by the hot air stream during the treatment period.

This has the advantage that the treatment temperature is maintained in a very defined manner, as is necessary in particular when very small amounts of milk are to be inactivated. The amount of heat stored for example in 20 ml of milk is very low, with the result that the milk heated to the treatment temperature cools down again very rapidly when the rotating container is exposed to the ambient air, as is the case in the generic method.

It is not absolutely necessary to continue to direct the hot air stream into the temperature-control chamber after the treatment temperature has been reached. This is because the warm air in the temperature-control chamber prevents the milk heated to a treatment temperature of 62 or 63° C., for example, from cooling within the treatment period of just a few seconds.

It is further preferred if, after the treatment period has elapsed, a cold water jet is directed from the outside onto the container located in the temperature-control chamber, the water jet preferably having a temperature below room temperature, more preferably below about 10° C.

This measure has the advantage of ensuring that the very short treatment durations of a few seconds can in fact be realized. The hot air stream is switched off at the latest as soon as the treatment period has elapsed, and at the same time the cold water jet is switched on, as a result of which the milk in the container is immediately cooled down. However, this cooling does not take place in an abrupt manner, but just as gently as the heating. This is because the container is generally a round-bottom glass flask in which, because of the lower thermal conductivity compared to liquid, the heating action and also the cooling action are transmitted to the milk only, as it were, with a delay.

Nonetheless, the novel method and the novel device make it possible, for the first time, for a short duration of treatment of 1, 2 or 3 seconds to be set precisely in a reproducible manner. In the prior art, the withdrawal of the container from the first water bath and its immersion in the second water bath always required a period of at least 5 seconds which could not be undercut.

By virtue of the common temperature-control chamber, and in particular by using a hot air stream and a cold water jet, it is now possible, for the first time, for defined and short treatment periods and defined treatment temperatures to be set.

Experiments conducted by the inventors have now shown that, using this novel device and the novel method, it is possible for breast milk containing infectious microorganisms to be treated in a volume of 20 ml for a few seconds at just over 60° C., and for the infectious microorganisms to be completely inactivated. In this method, however, the biochemical parameters are either entirely maintained or they are at least compromised much less than in the generic method.

In the novel device, it is preferred if the cold source is a water bath which is preferably connected to the temperature-control chamber via a cold water nozzle, a feed pump preferably being arranged between the water bath and the cold water nozzle.

This has the advantage that the cold water jet directed into the temperature-control chamber, and acting on the rotating container therein, can be generated from a "standard" water bath.

It is further preferred if the temperature-control chamber communicates with the water bath via an outlet opening, the water bath preferably having a water tank arranged under the temperature-control chamber.

These measures are of advantage in design terms, since the cold water sprayed into the temperature-control chamber runs as it were immediately down into the water tank which is part of the water bath from which the cold water jet is supplied.

It is further preferred if the hot air source is connected to the temperature-control chamber via a heating channel, the heating channel preferably opening into the temperature-control chamber at a point below the cold water nozzle.

It has been found that particularly effective heating and cooling can be achieved with this configuration, that is to say with a cold water nozzle that is located higher up than the entrance opening of the hot air source. In this way it is also possible to provide the entrance areas of hot air source and water jet on the same side of the temperature-control chamber, so as to avoid the water jet getting into the heating channel. These measures are therefore also of advantage in design terms, since they mean it is not necessary to provide extensive safety measures against cold water getting into the hot air source.

It is further preferred if the hot air source comprises a fan and a heating register which can be separately controlled and/or regulated.

As has already been mentioned, it is not absolutely necessary to regulate the hot air source as a function of the actual temperature of the milk. In many cases it may be sufficient to define so-called standard conditions with which milk quantities at room temperature can be inactivated in a defined round-bottom flask using suitable methods. With such control of the whole procedure, it is not necessary to measure the temperature of the milk in the container.

However, in order to establish optimal control parameters, it may be necessary to determine the temperature of the milk in the container and, as a function of the change in temperature, to regulate the fan speed and the temperature of the heating register. If a regulation sequence of this kind is then recorded and averaged out over a large number of inactivation procedures, optimal parameters are then obtained that can be used for a control process in which measurement of the temperature of the milk in the container can be dispensed with.

It is generally also preferred if a runner is provided for introducing the container into the temperature-control chamber, the arrangement by which the container is held and moved, preferably set in rotation, being secured on the runner.

It has been found that an important feature of the novel method and of the novel device is the milk film that forms on the inside wall of the container when the latter is moved or preferably set in rotation. It is not absolutely necessary to actually rotate the container for this purpose; a suitable shaking movement also suffices.

However, it is particularly preferred for the container to be rotated at a speed of over 150 rpm, preferably of about 300 rpm.

Further advantages will become evident from the description and from the attached drawing.

It will be appreciated that the features and advantages mentioned above and those still to be explained below can be used not only in the respectively cited combinations, but also in other combinations or singly, without departing from the scope of the present invention.

An illustrative embodiment of the invention is depicted in the figures.

DETAILED DESCRIPTION OF THE PREFERRED EMBODIMENT

Figure 1:
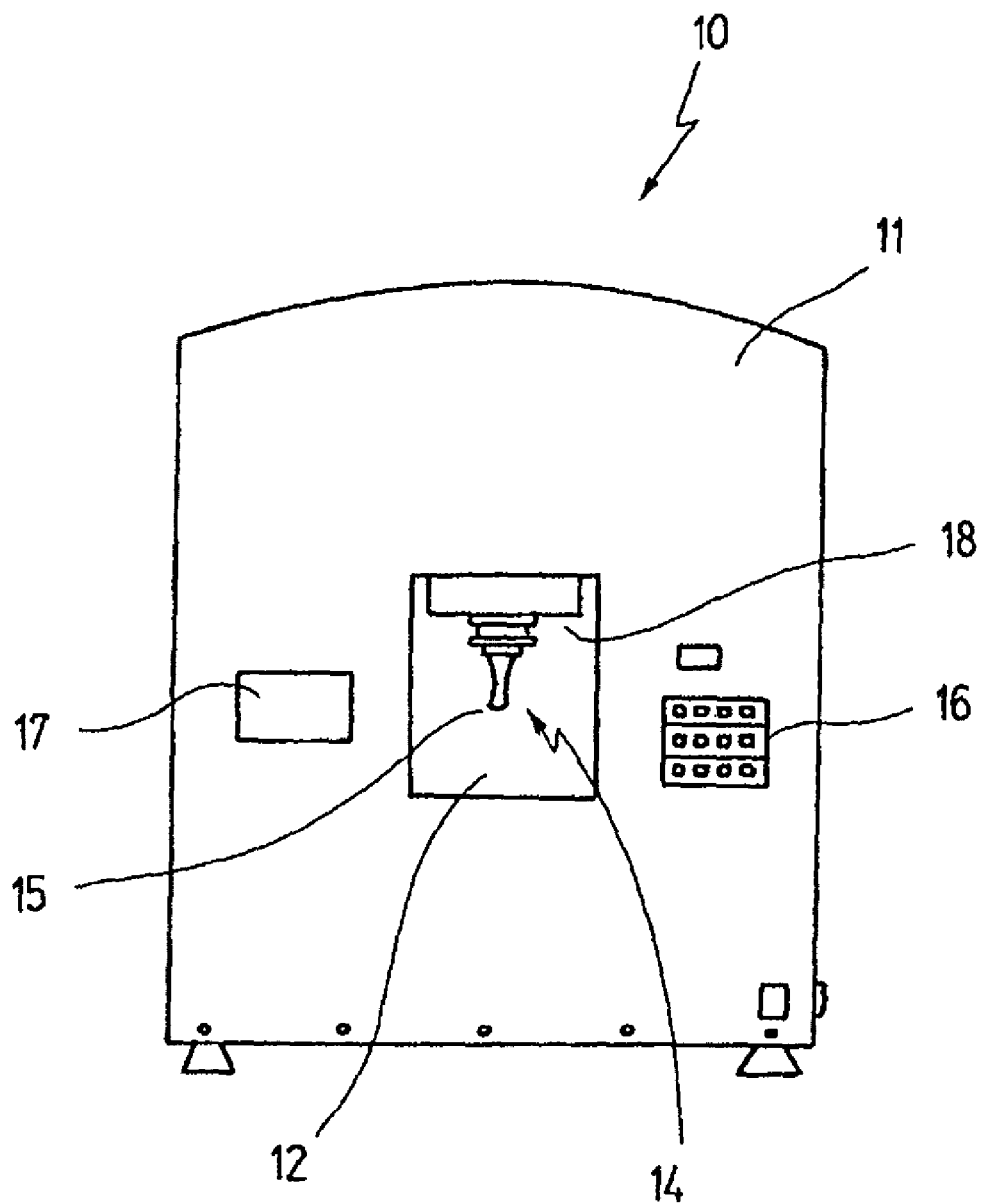
FIG. 1 shows a schematic front view of the novel device.

The novel device is designated by reference number 10 in FIG. 1 and is shown in a schematic front view. The device 10 comprises a housing 11 with a loading aperture 12 through which an arrangement 14 with a temperature sensor 15 can be seen. This arrangement 14 is used for heating and rotating a container in which milk that is to be inactivated is introduced. The temperature sensor 15 is in this case used to measure the temperature of the milk film that forms during rotation of the container, as has already been described in principle in WO 00/74494 A2.

A control panel 16 and a monitor 17 are also shown on the device 10. Various program sequences or parameters can be input via the control panel 16, and the progress of the inactivation method can be viewed on the monitor 17.

In the loading aperture 12 in FIG. 1, it will also be seen that the arrangement 14 comprises a holder 18 for a container.

Figure 2:
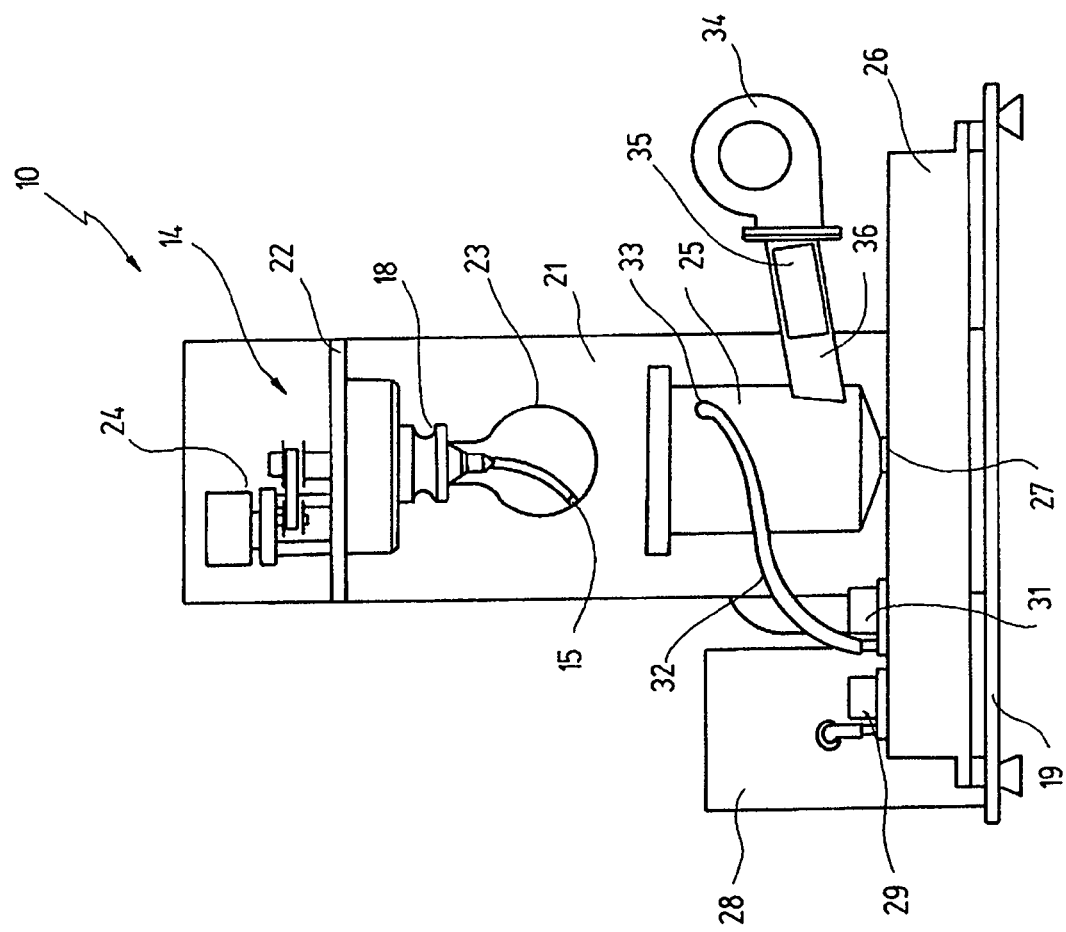
FIG. 2 shows a view as in FIG. 1, but without the housing.

In FIG. 2, the device 10 from FIG. 1 is shown without the housing 11, but once again in a schematic front view. The device 10 first comprises a base plate 19 on which the other components of the device 10 are mounted.

A stand 21 extends upward from the base plate 19, and a runner 22 is arranged on the stand 21 so as to be vertically displaceable thereon. The runner 22 carries the arrangement 14 from FIG. 1, in particular the holder 18 for a round-bottom flask, and also the temperature sensor 15. In FIG. 2, a round-bottom flask 23 is mounted on the holder 18, the temperature sensor 15 bearing on the inner face of the round-bottom flask 23 in order to measure there the temperature of the milk film that forms during rotation of the round-bottom flask 23.

The round-bottom flask 23 is rotated by way of a drive unit 24, which is indicated schematically on the runner 22.

In front of the stand 21, below the runner 22, there is a common temperature-control chamber 25 into which the round-bottom flask can be immersed from above by means of the runner 22 being lowered. Provided below the temperature-control chamber 25 there is a water tank 26, with which the temperature-control chamber 25 communicates via an outlet opening 27.

On the left-hand side, behind the water tank 26, a cooling unit 28 is indicated which cooperates with a circulation pump 29 and cools the water in the water tank 26 to a low temperature, for example 10° C.

Provided on the water tank 26 there is also a booster pump 31 which is connected via a tube 32 to a cold water nozzle 33 that passes into the interior of the temperature-control chamber 25. In this way it is possible, by switching on the booster pump 31, to direct a jet of cold water into the interior of the temperature-control chamber 25, where this water jet strikes the rotating round-bottom flask 23.

On the right-hand side next to the stand 21, a fan 34 is indicated which blows hot air through a heating register 35 into a heating channel 36, which likewise leads into the interior of the temperature-control chamber 25, albeit at a lower level than the cold water nozzle 33.

Figure 3:
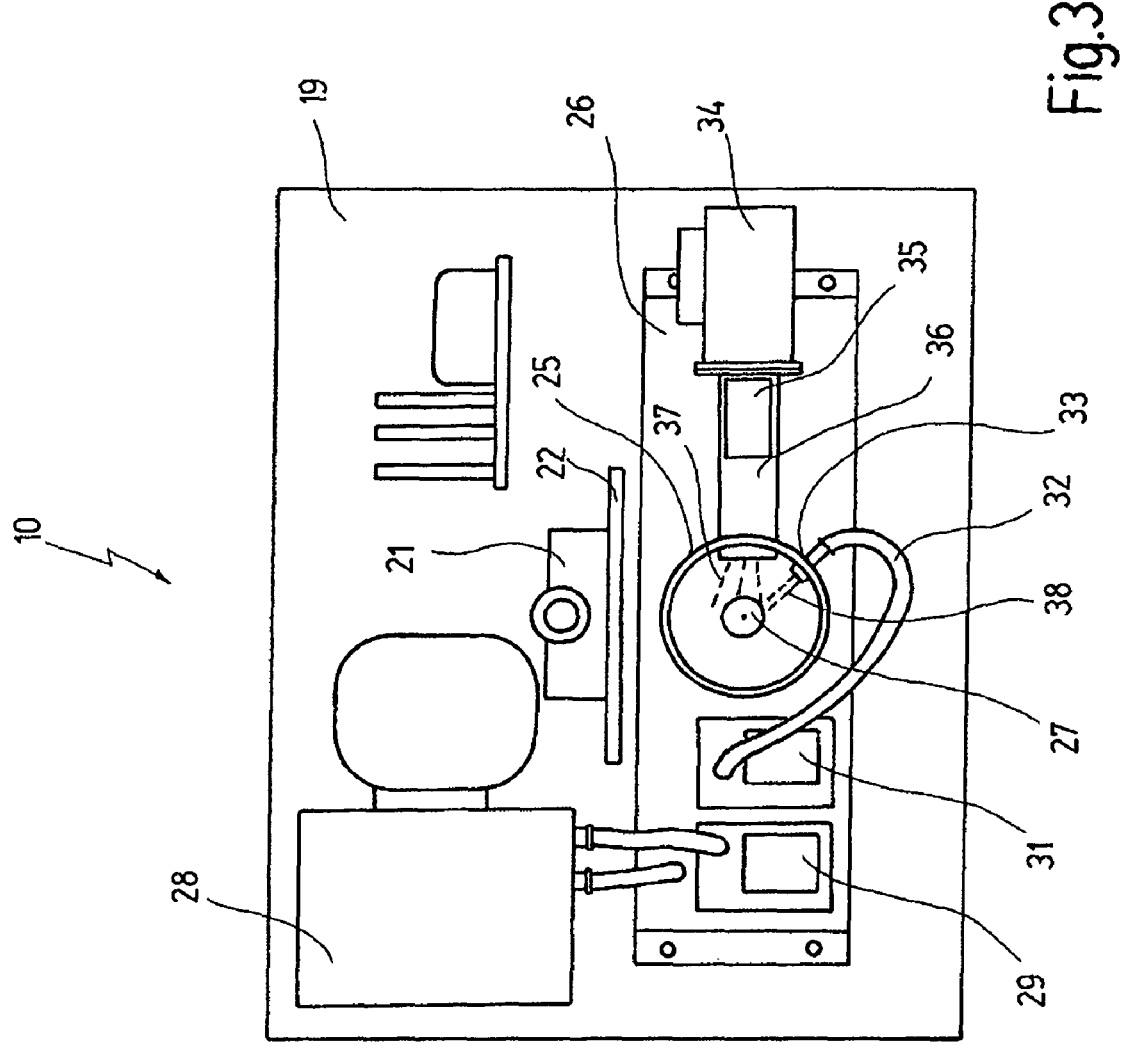
FIG. 3 shows a plan view of the device from FIG. 2.

The structure from FIG. 2 is shown in a plan view in FIG. 3. The latter indicates that a hot air stream 37 is directed via fan 34, heating register 35 and heating channel 36 into the temperature-control chamber 25, whereas a cold water jet 38 can be directed via booster pump 31, tube 32 and cold water nozzle 33 into the interior of the temperature-control chamber 25.

The device that has been described thus far is used to carry out the following method for inactivation of infectious microorganisms located in breast milk:

The breast milk is introduced into the round-bottom flask 23, which is then secured on the holder 18. In this state, the runner 22 is in a raised position, as is shown in FIG. 3.

The round-bottom flask 23 is now set in rotation via the drive unit 24, and the runner 22 immerses the round-bottom flask from above into the temperature-control chamber 25.

Thereafter, the fan 34 and the heating register 35 are switched on, in order to direct hot air into the interior of the temperature-control chamber and onto the rotating round-bottom flask 23 therein.

Depending on the setting of the fan 34 and of the heating register 35, the milk in the round-bottom flask 23 now heats to a treatment temperature which is at most 65° C. for example, but can also be 63° C. or 62° C.

During a heating phase that lasts longer than 30 seconds, preferably about 60 to 80 seconds, the milk in the round-bottom flask 23 is now heated to the treatment temperature.

For this purpose, the fan 34 and heating register 35 can be controlled according to various control principles. For example, it is possible to operate them in the manner of a two-position controller, in which the fan 34 and heating register 35 are either switched on or off. However, a proportional controller can also be used which drives a type of heating program in which the fan speed and the temperature of the heating register 35 are controlled or regulated as a function of the temperature difference between the milk and the defined treatment temperature.

As soon as the treatment temperature is reached, it is maintained for a treatment period of less than 5 seconds, preferably of 3 seconds or less. For this purpose, it may be necessary to continue to blow the hot air stream 37 into the temperature-control chamber 25. However, it may also suffice to switch off the hot air stream 37, since the hot air present in the temperature-control chamber 25 is sufficient to prevent the milk in the round-bottom flask 23 from cooling during the very short treatment period.

After the treatment period has elapsed, the booster pump 31 is switched on so that the cold water jet 38 strikes the rotating round-bottom flask, and the milk in the round-bottom flask 23 cools toward room temperature again.

The whole treatment is completed after about 2½ minutes, and the milk is at about room temperature.

Figure 4:
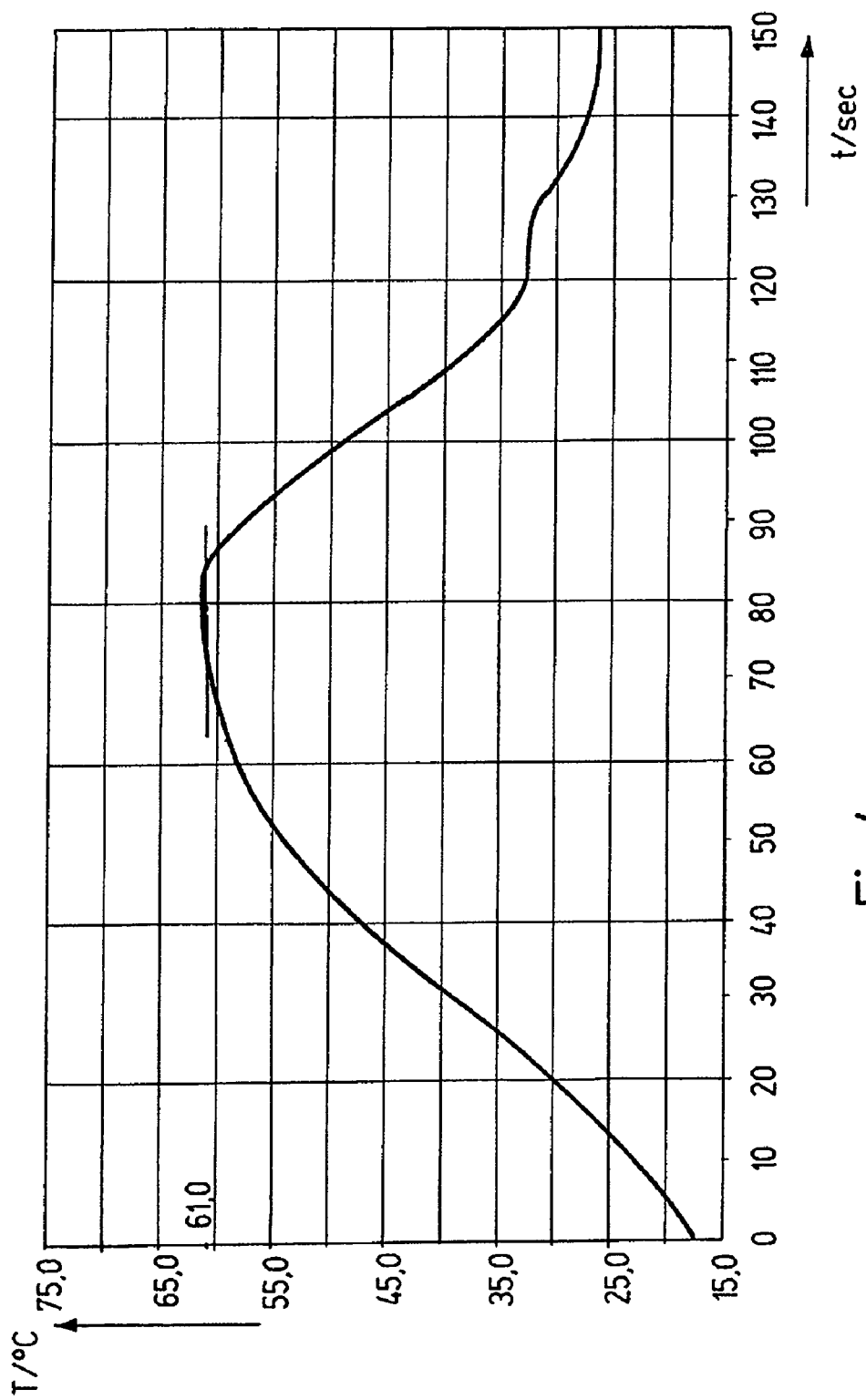
FIG. 4 shows an example of a temperature profile during inactivation of 20 ml of breast milk in a round-bottom glass flask.

FIG. 4 shows a temperature/time profile for a typical inactivation of 20 ml of breast milk that was previously cooled and has a starting temperature of about 15° C. After about 75 seconds, the milk has reached the treatment temperature of 61° C., and it remains at this treatment temperature for a treatment period of 4 to 5 seconds. Thereafter, the hot air jet 37 is switched off and the cold water jet 38 is switched on, so that the milk cools down to room temperature within about 60 seconds.

Figure 5:
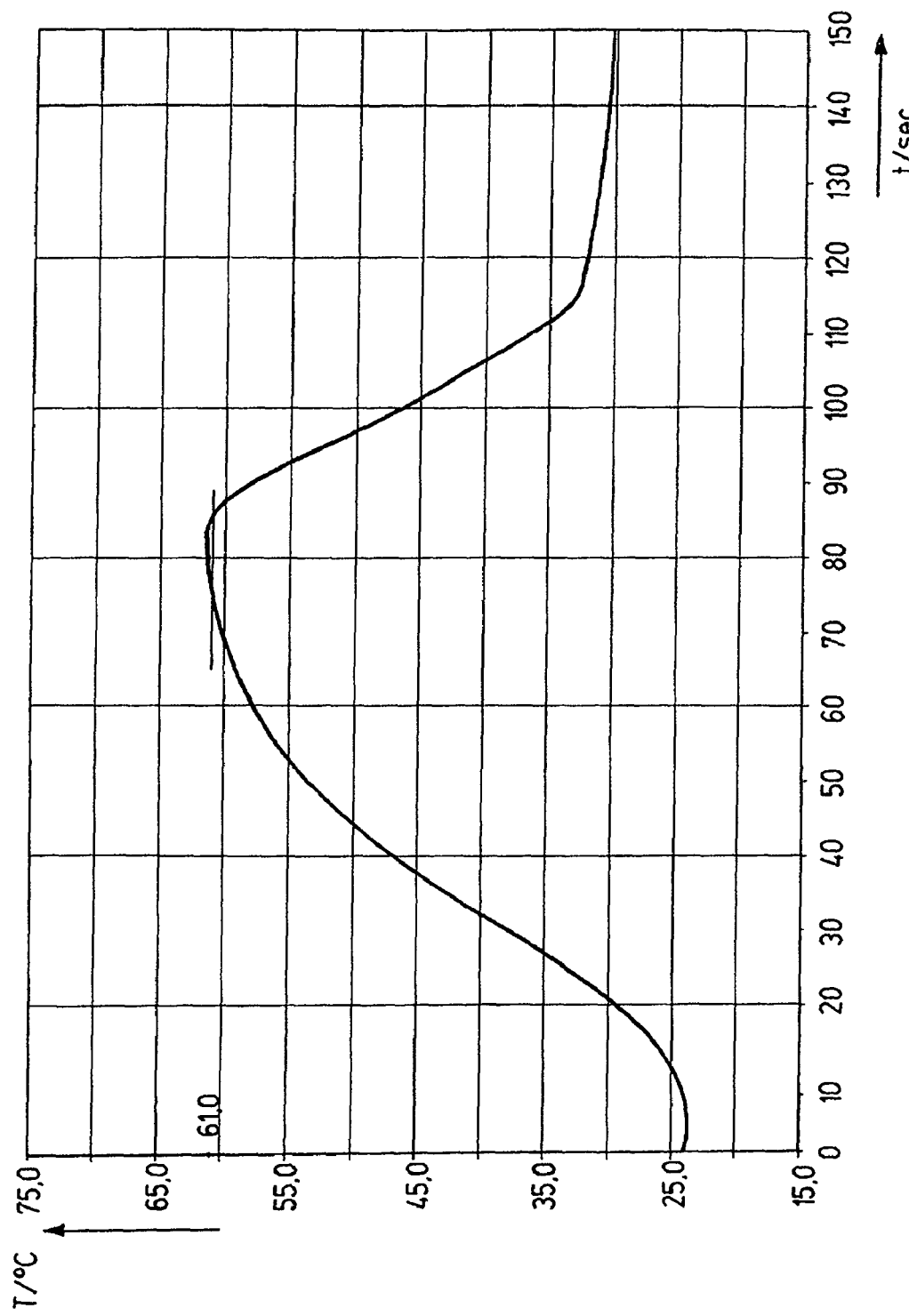
FIG. 5 shows a temperature profile as in FIG. 4, but measured on distilled water instead of breast milk.

FIG. 5 shows the same treatment sequence, but now for 20 ml of distilled water. Despite the different thermal conductivity and heat storage capacity of milk and water, the temperature/time curve in FIG. 5 is comparable to the curve in FIG. 4.

Using the method described thus far, the inventors of the present application inactivated native milk from breastfeeding, CMV-seronegative mothers in 20-ml samples with the novel device 10, after a defined amount of virus of the virus strain CMV AD 169 was added to said samples.

After the treatment, and with the aim of detecting the CMV infectivity, the CMV-DNA and the CMV-RNA, the milk was checked for its inactivation in the manner described in Example 4 of WO 00/74494 A2, whose content is hereby expressly made the subject of the present application. A comparison between the novel method and the three methods tested according to WO 00/74494 A2 revealed that the virus inactivation with the novel method was just as effective as the two heat inactivations from the prior art. In the novel method too, no reduction of total protein and albumin was seen, and the concentration of vitamin B12 and folic acid was not reduced.

However, the activity of alkaline phosphatase and of lipase was significantly better in the novel method, as the following table shows.

| Inactivation | AP activity | Lipase activity |
|---|---|---|
| Control | 100% | 100% |
| 2 sec 72° C. | 4.4% | 6.8% |
| 2 sec 65° C. | 13.0% | 11.9% |
| 2 sec 63° C. | 52.2% | 10.2% |
| 1 sec 62° C. | 56.5% | 10.2% |
| 30 min 62.5° C. | 4.4% | 5.1% |

In the novel method, where the milk was treated for one or two seconds at 62, 63 or 65° C., the lipase activity was about twice as high as in the short-time inactivation at 72° C. and in the Holder pasteurization.

The AP activity was also much higher than that in the known methods.

What is claimed is:

1. A method for treating milk, in which the milk is briefly heated in a container, said method comprising the following steps:
   a) the container is moved so that a milk film forms on its inner wall,
   b) the milk is heated to a maximum first temperature during a heating phase,
   c) the milk is maintained at said maximum first temperature for a treatment period of less than 20 seconds,
   d) the milk is cooled from said maximum first temperature to a second temperature below said maximum first temperature,
   wherein the maximum first temperature is below 63° C., and the maximum heating temperature during the method does not exceed 63° C.

2. The method as claimed in claim 1, wherein said milk is breast milk.

3. The method as claimed in claim 1, wherein in step a) said container is set in rotation.

4. The method as claimed in claim 1, wherein said heating phase lasts longer than 30 seconds, but is shorter than 180 seconds.

5. The method as claimed in claim 4, wherein said heating phase lasts longer than 60 seconds, but is shorter than 180 seconds.

6. The method as claimed in claim 1, wherein said treatment period is less than 5 seconds.

7. The method as claimed in claim 1, wherein said treatment period is less than or equal to 3 seconds.

8. The method as claimed in claim 1, wherein said container is immersed in a temperature-control chamber during steps a) to d).

9. The method as claimed in claim 8, wherein during said heating phase, the milk is heated to said first maximum temperature by an air stream that acts on the outside of said container.

10. The method as claimed in claim 9, wherein, after said heating phase, said container remains in said temperature-control chamber.

11. The method as claimed in claim 9, wherein said container is maintained at said first maximum temperature by said air stream during said treatment period.

12. The method as claimed in claim 9, wherein said air stream is controlled and/or regulated in terms of its temperature and/or its flow velocity.

13. The method as claimed in claim 8, wherein after said treatment period has elapsed, a water jet is directed from the outside onto said container located in said temperature-control chamber.

14. The method as claimed in claim 13, wherein said water jet has a temperature below 10° C.

* * * * *